May 21, 1940.  H. T. KRAFT  2,201,668

METHOD OF MAKING VEHICLE TIRE TREADS

Filed July 19, 1937

INVENTOR
Herman T. Kraft
BY Evans + McCoy
ATTORNEYS

Patented May 21, 1940

2,201,668

UNITED STATES PATENT OFFICE 2,201,668

METHOD OF MAKING VEHICLE TIRE TREADS

Herman T. Kraft, Akron, Ohio, assignor to The General Tire & Rubber Company, Summit, Ohio, a corporation of Ohio Application July 19, 1937, Serial No. 154,443

7 Claims. (Cl. 154—14)

This invention relates to a method of making treads for rubber tires and has for its object to provide a simple and economical method of making elastic, slip-resisting treads of the flexible rib type such as disclosed in my Patent No. 2,048,635, July 21, 1936.

The treads of tires of the type above referred to have heretofore been formed in vulcanizing molds provided with internal ribs conforming to the spaces between the ribs. The original cost of such molds is high and maintenance is expensive. If the spaces between the ribs be made as narrow as desirable the thin ribs on the interior of the mold are apt to be bent or broken in removing tires from the mold.

It has been suggested to form the ribs in the tire tread after vulcanizing by making closely spaced parallel cuts in a thick, smooth tread formed upon a pneumatic tire. The cutting method, however, is open to the objection that the side faces of the ribs spring back into contact after the cut is made with the result that the tread is almost as stiff after cutting as before.

The present invention provides a method of forming a tread composed of non-contiguous but closely spaced finlike ribs by which a tire tread with closely spaced ribs is formed of uncured rubber prior to insertion of the tire into the vulcanizing mold and are kept from adhering one to another during vulcanizing by thin layers of material to which the rubber does not adhere built into the tire tread so that a relatively soft and elastic tread is formed and a mold with a smooth interior surface may be employed for vulcanizing the tire.

With the above and other objects in view the invention may be said to comprise the method as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification, in which.

In the accompanying drawing the invention is shown applied to the construction of a tread for a pneumatic tire 1, the tire having a thickened tread portion 2, the ground engaging portion of which is composed entirely of closely spaced parallel elastic finlike ribs 3 which are separated by narrow grooves 4.

The method of the present invention consists in building a tire with a tread thereon prior to vulcanization which tread consists of a continuous integral base portion and an outer portion composed of parallel finlike ribs of a height more than twice the thickness thereof, together with thin spacer strips of an adhesion-preventing material such as paper of about 1/64" in thickness which are interposed between successive ribs with their outer edges flush with the outer edges of the ribs. The ribs may be formed in the uncured rubber tread stock in any suitable manner but it is preferred to build the tread up of separate strips of uncured ribs to which the separating strips are secured.

Figure 1:
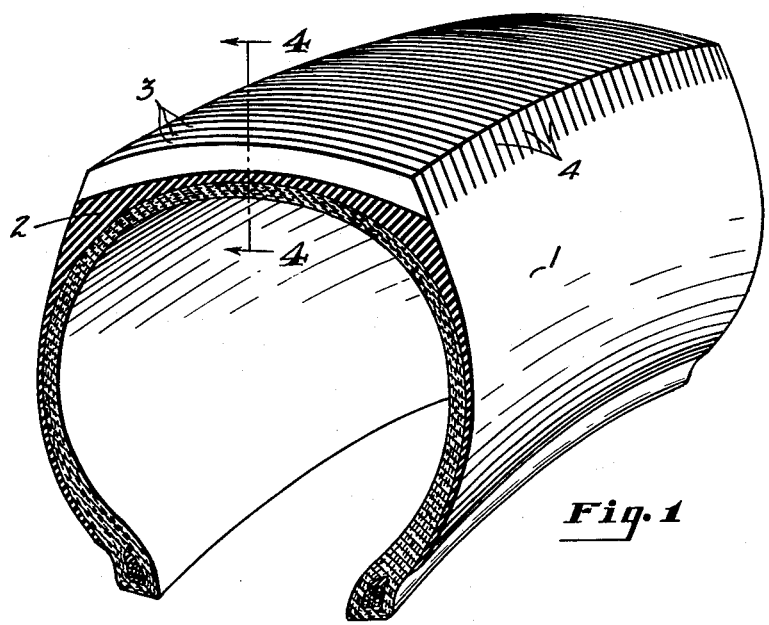
Figure 1 is a perspective view of a finished tire having a tread constructed by the method of the present invention.
Figure 4:
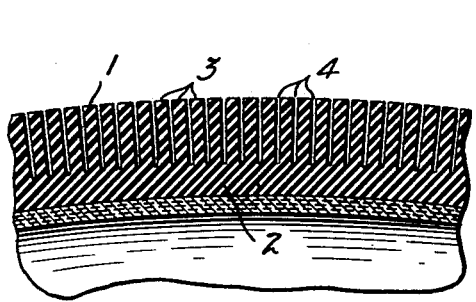
Fig. 4 is a section taken on the line indicated at 4—4 of Fig. 1.
Figure 2:
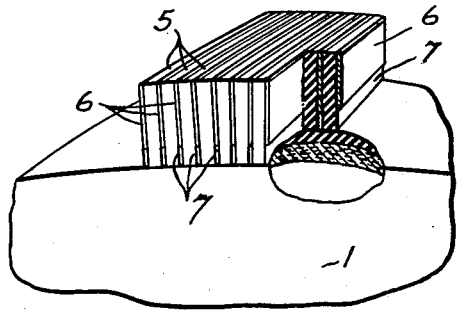
Fig. 2 is a fragmentary sectional view showing the manner in which the strips of uncured rubber and of adhesion-preventing material are assembled in a tire tread.
Figure 3:
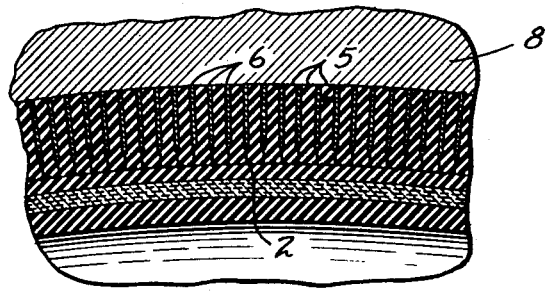
Fig. 3 is a fragmentary sectional view showing a portion of the tread within the vulcanizing mold.

As shown in Fig. 2 the tire tread may be built up of a series of strips 5 of uncured rubber each of a thickness corresponding to the thickness of the ribs to be formed in the treads and a width corresponding to the depth of the tread stock, the width of the strips 5 being several times the thickness thereof. Strips of paper or other adhesion-preventing material separate the outer rib forming portion of the strips while the inner sides and face portions 7 of the strips are uncovered and adapted to be adhered together by pressure in assembly and to be integrally united upon vulcanization under pressure in the tire mold. The tire stock may be built up flat in strips of a length suitable for application to a tire carcass or may be built directly upon the tire carcass if desired, as shown in Fig. 2. The strips of rubber 5 and paper 6 may be applied successively in building up the tread or the strips may be applied to the rubber strips before they are cut to length.

After assembling the strips and separating material on a tire carcass the tire may be placed in a mold and subjected to heat and internal pressure to vulcanize the uncured rubber of the tire. The vulcanization causes the uncured rubber in the base portion of the tread to unite integrally throughout the circumference of the tire while the ribs are kept out of contact by the intermediate strip 6. The mold 8 confines the rubber within the outer edges of the separating strips and after vulcanization the strips 6 may be removed or, if not removed, will drop out of the tread after it has been put into service.

The present invention provides a simple and economical method of building rib tires of the type having closely spaced flexible finlike ribs which eliminates difficulties of molding and provides non-contiguous but closely spaced ribs throughout the surface of the tire tread.

I claim:

1. The herein described method of making tire tread stock which comprises assembling side by side and pressing together strips of vulcanizable rubber and intermediate strips of paper, the strips of paper being narrower than the strips of rubber and interposed between the outer portions of the side faces of the rubber strips, the inner portions of the side faces of the rubber strips being in contact.

2. The herein described method of making pneumatic tires with treads of the flexible rib type which comprises assembling face to face strips of a vulcanizable rubber composition of substantially equal width with intermediate narrower strips of a material to which the rubber does not adhere, face portions of the rubber strips along their inner edges being in contact and the remainder of their faces outwardly of said inner edge portions separated by the thin strips of adhesion-preventing material, pressing the strips together to unite the contacting portions of the rubber strips to form tread stock with a continuous integrally united base portion and an outer portion composed of closely spaced ribs and spacing strips, applying said tread stock to a tire carcass, and vulcanizing under pressure in a tire mold.

3. The herein described method of forming rubber tires which comprises forming a strip of tread stock having a continuous base portion of rubber and an outer face portion composed of closely spaced finlike ribs of vulcanizable rubber extending outwardly from the base and thin layers of material to which the rubber does not adhere in the spaces between the ribs and separating the side faces of adjacent ribs, applying the tread stock to the periphery of a tire and vulcanizing the same under heat and pressure in a mold to form a tire tread with closely spaced finlike ribs separated by narrow grooves.

4. The herein described method of forming rubber tires which comprises forming a strip of tread stock having a continuous base portion of rubber and an outer face portion composed of closely spaced finlike ribs of vulcanizable rubber extending outwardly from the base and transversely across the strip, and thin layers of material to which the rubber does not adhere in the spaces between the ribs and separating the side faces of adjacent ribs, applying the tread stock to the periphery of a tire and vulcanizing the same under heat and pressure in a mold to form a tire tread with closely spaced finlike ribs separated by narrow grooves.

5. The herein described method of forming rubber tires which comprises forming a strip of tread stock having a continuous base portion of rubber and an outer face portion composed of closely spaced finlike ribs of vulcanizable rubber extending outwardly from the base and a spacing strip of paper of a width corresponding to the height of the ribs interposed in each space between ribs to prevent contact between the side faces of adjacent ribs, applying the tread stock to the periphery of a tire and vulcanizing the tread under heat and pressure in a mold to form a tread with closely spaced finlike ribs separated by narrow grooves.

6. The herein described method of making tire tread stock which comprises assembling side by side on edge strips of vulcanizable rubber composition with thin intermediate strips of material to which the rubber does not adhere, disposes between and separating the outer portions of the side faces of the rubber strips and with inner portions of the side faces of the rubber strips contacting beyond the inner edges of the intermediate strips, and pressing the contacting portions of the rubber strips together to join the same.

7. The herein described method of making tire tread stock which comprises assembling side by side on edge strips of vulcanizable rubber composition of a width several times their thickness, with intermediate thin strips of adhesion-resisting material separating outer portions of the side faces of the rubber strips throughout their length, and pressing said strips together to unite the rubber strips inwardly of the intermediate strips and form a continuous rubber base portion.

HERMAN T. KRAFT.